United States Patent [19]
Von Thuna

[11] 3,865,467
[45] Feb. 11, 1975

[54] RETROREFLECTING BEAM SPLITTER AND APPARATUS FOR MEASURING GRAVITY GRADIENTS EMBODYING THE SAME

[75] Inventor: Peter C. Von Thuna, Lexington, Mass.

[73] Assignee: Arthur D. Little, Inc., Cambridge, Mass.

[22] Filed: Aug. 7, 1970

[21] Appl. No.: 62,070

[52] U.S. Cl.................................. 350/102, 73/382
[51] Int. Cl............................................ G02b 5/12
[58] Field of Search............ 350/102, 173; 356/110, 356/113; 73/382

[56] References Cited
UNITED STATES PATENTS

| | | |
|---|---|---|
| 1,957,797 | 5/1934 | Oestnaes et al..................... 350/102 |
| 3,072,011 | 1/1963 | Hemstreet et al............. 356/113 X |
| 3,194,109 | 7/1965 | Erickson............................. 356/110 |
| 3,540,801 | 11/1970 | Schmidt.......................... 350/102 X |

*Primary Examiner*—David H. Rubin
*Attorney, Agent, or Firm*—Bessie A. Lepper

[57] ABSTRACT

Method and apparatus for measuring gravity gradients directly. Two retroreflectors are caused to experience free flight, and the radiation relfected by these retroreflectors during free flight is directed to a detector in a manner to cause interference between the reflected beams. The lower retroreflector is made to serve as a beam splitter thus making it possible to use a single optical path and minimize the number of optical components required. The interference frequency is determined as a function of time; and the rate of change of this frequency is directly related to gravity gradient.

9 Claims, 14 Drawing Figures

INVENTOR.
Peter C. vonThüna

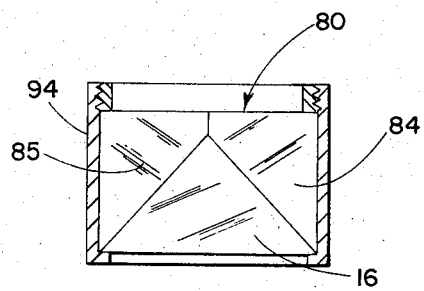
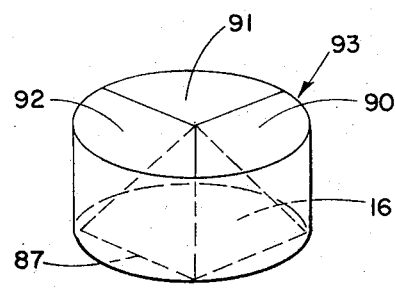
Fig. 9
Fig. 10
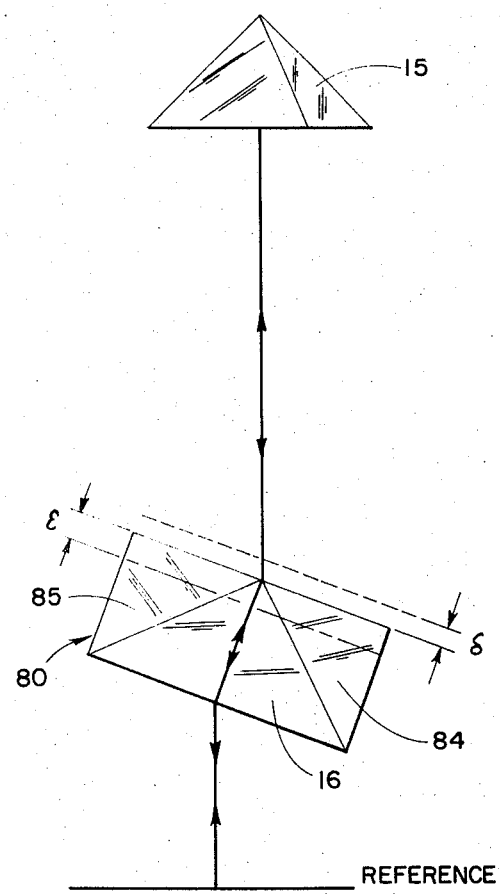
Fig. 11
Fig. 12

RETROREFLECTING BEAM SPLITTER AND APPARATUS FOR MEASURING GRAVITY GRADIENTS EMBODYING THE SAME

This invention relates to a retroreflecting beam splitter and to an apparatus for measuring gravity gradient incorporating the beam splitter. More particularly this invention relates to an apparatus which provides a direct and immediate measure of gravity gradients.

The determination of gravity gradients has long been known to be a very desirable way of sampling relatively large volumes of strata because of the simple dependence of the vertical gravity gradient on the density of the strata. As an example, the determination of gravity gradients may be widely used to detect the presence and to evaluate the extent of ore bodies and oil reserves beneath the surface of the earth. Presently, vertical gradients of gravity are obtained from measurements of gravity at various levels, such as by lowering a gravimeter down a borehole. (See for example "The U.S. Geological Survey - LaCoste and Romberg, Precise Borehole Gravimeter System — Instrumentation and Support Equipment" by T. H. McCulloh, L. J. B. LaCoste, J. E. Schoellhamer and E. H. Pampeyan in Geological Survey and Research 1967 and "The U.S. Geological Survey — LaCoste and Romberg, Precise Borehole Gravimeter System-Test Results" by T. H. McCulloh, J. E. Schoellhamer, E. H. Pampeyan and H. B. Parks in Geological Survey Research 1967.) These attempts, although encouraging, result in operations that are time-consuming and limited in resolution. Direct-reading gravity gradiometers have also been proposed. (See for example U.S. Pat. Nos. 2,618,156, 3,011,346, 3,095,744, 3,180,151 and 3,250,133.) However, the practical utility of such instruments is hindered by technical difficulties which are encountered in confined spaces such as boreholes.

Other borehole or well surveying methods and apparatus have been developed over the years in an attempt to overcome the difficulties encountered in the construction of a rugged, reliable and easily operated instrument capable of measuring density of surrounding strata. These alternate methods and apparatus have been based upon the measurements of the velocity of sound of the injection of $\gamma$-rays into a stratum and determination of the $\gamma$-rays which are returned. These types of measurements suffer from the fact that their effective range beyond the borehole into which it is placed is very limited. Typically, this effective radius is not more than a few inches. In contrast, a sensitive and reliable gravity gradiometer should have an effective radius of detection in the range of several feet.

The various possible uses for a gravity gradiometer indicate the desirable characteristics one should possess. One use is in oil well logging in which the instrument is lowered into an existing well to determine the properties of the surrounding strata as a function of depth. Thus any gravity gradiometer used in a borehole to determine the gravity gradients along the entire depth of the hole must be very compact in size, have a minimum number of external connections, and be reliable and rugged.

Another use for a gravity gradiometer is in general surface prospecting in which gravity gradients are measured and plotted over a surface area, whether the area is land or water. On land, this may be done by stopping at predetermined points and making measurements. This same process may also, of course, be done on the water surface. However, this method of periodically stopping to determine gravity is a very expensive way of obtaining such measurements and often the terrain or sea conditions make such measurements hazardous or even impossible. This in turn has led to making gravity measurements over an area from an airplane of helicopter. Presently available instruments are, however, influenced by the motion of the airplane or helicopter and the "noise" resulting from such motion detracts from their useful sensitivity. Thus the use of a gravity gradiometer in general surface prospecting indicates that the instrument should be one which in its operation is independent of vehicle motion.

In a copending application, Ser. No. 25,153, filed Apr. 2, 1970, and now abandoned in the name of Richard S. Stone and assigned to the same assignee as this application, there is described a novel gravity gradiometer. In this gradiometer two bodies which are capable of reflecting radiant energy are caused to undergo free flight under gravity with vertical separation and relative velocity known at one point in time. Energy is furnished in the form of two distinct beams of radiation one being directed along a path to the first body and the other being directed along another path to the second body. The necessity to provide two parallel beams of light to the reflecting bodies requires a larger volume within the instrument than if a single beam could be used. Although the instrument of Ser. No. 25,153 can be made in sufficiently small diameters for dropping down a standard sized borehole, it would be desirable to have a gravity gradiometer of the type of Serial No. 25,153 which could be constructed in extremely small diameters.

In a second copending application, Ser. No. 62,110 filed Aug. 7, 1970, now U.S. Pat. No. 3,727,462 issued Apr. 17, 1973, in the names of Richard S. Stone et al. and assigned to the same assignee as this application, there is disclosed a gravity gradiometer of the general type described in Ser. No. 25,153 which is so modified as to make the instrument essentially insensitive to forces created by the earth's rotation, to errors due to the attitude of the platform, and to accelerations and decelerations of the platform, and hence usable on a moving platform such as an airplane or helicopter to do rapid surface prospecting.

It is therefore a primary object of this invention to provide a novel retroreflecting beam splitting optical element. It is another primary object of this invention to provide an improved apparatus for directly measuring gravity gradients, the apparatus being one which incorporates the retroreflecting beam splitter. It is still another object to provide an apparatus of the character described which in its operation is independent of its motion, is rugged and reliable and has a minimum number of external connections. An additional object of this invention is to provide a gravity gradiometer which is particularly suitable for operation in a borehole since it can be made in very small diameters. Yet another object is to provide an instrument of the character described which employs a unique beam splitting means making it possible to use a single optical path in an interferometric apparatus. Other objects of the invention will in part be obvious and will in part be apparent hereinafter.

The invention accordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which FIG. 1 is a diagrammatic representation illustrating in cross section one form of a gravity gradiometer constructed in accordance with this invention;

FIGS. 8 and 9 are cross sectional views of two modifications of the retroreflecting beam splitter assembly of this invention;

FIG. 10 is a perspective view of another modification of the retroreflecting beam splitter of this invention;

FIG. 11 is a diagram of the optics of the retroreflecting beam splitter;

FIG. 12 is a simplified diagram of a modification of the optics of the gradiometer;

The gravity gradiometer of this invention employs two retroreflecting assemblies, one directly above the other. The lower of these retroreflecting assemblies is also a beam splitter. These retroreflecting assemblies are caused to undergo free flight under gravity with vertical separation known at one point in time. Energy is furnished in the form of a single beam of radiation derived from a single source of substantially coherent, and preferably monochromatic, radiation; and it is transmitted to the two retroreflectors in free flight for reflection to a detector in a way to bring about optical interference. The detector measures the temporal variations of intensity of the interfering reflected radiation beams. This temporal variation of the output signal of the detector will be substantially as diagrammed in FIG. 13. The time rate of change of the angular frequency of this signal is directly related to the vertical gradient of gravity. In the absence of gravity gradient, that is, if the gravity is everywhere constant, a constant signal frequency anywhere from zero to a few thousand Hertz will be obtained, depending upon the relative initial velocity of the retroreflectors. In the presence of a gravity gradient, one of the retroreflectors experiencing free flight will be accelerated more than the other and the relative velocity of the retroreflectors will change. The signal frequency which is a measure of relative velocity, will change at a rate directly proportional to the difference in gravity at the two retroreflector locations, and the time rate of change of the frequency of the detector signal will be directly related to the gravity gradient.

Gravity measuring devices have been disclosed which use a single falling body and interferometric techniques. (See "An Absolute Interferometric Determination of the Acceleration of Gravity" by James E. Faller, Palmer Physical Laboratory, Princeton University, Princeton, New Jersey, March, 1963 and U.S. Pat. No. 3,429,184.) However, these devices are not capable of measuring gravity gradients directly.

Figure 1:
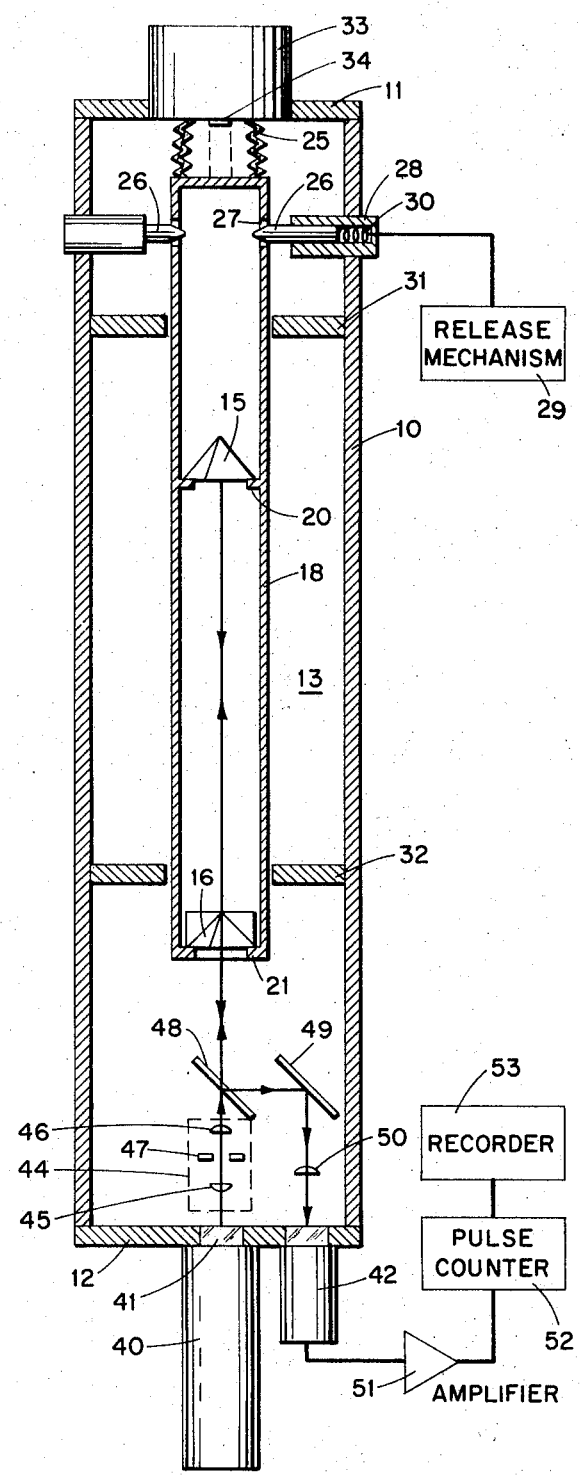

One illustrative diagrammatic representation of an instrument which embodies the optical features of this invention is shown in FIG. 1. It will be appreciated that there are a number of ways by which the retroreflecting assemblies may be put into a free flight condition and that the apparatus diagrammed in FIG. 1 is illustrative of only one of these. In the apparatus of FIG. 1 the two retroreflectors are shown simply as corner cubes. Several embodiments of the retroreflecting assemblies are shown and described in detail with reference to FIGS. 2–10.

In the apparatus diagrammed in FIG. 1 the retroreflectors experience free flight through two essentially equal distances which are defined between two distinctly different vertical positions, one being directly above the other. The corner cubes are put into their free flight condition by being propelled upwardly to their upper vertical levels. The propelling means and the optical components are located within a fluid-tight housing conveniently constructed as a cylindrical tubing 10 with a top member 11 and bottom member 12, one of which may be integral with the cylindrical section. The chamber volume 13 defined within the housing is evacuated, preferably to a pressure no greater than $10^{-4}$ torr. Within chamber 13, the two retroreflecting corner cubes 15 and 16 are supported in retroreflecting assemblies (see FIG. 2) within an accelerating carriage 18 on annular ring support 20 and 21, respectively. These supports are mounted on the internal wall of the accelerating carriage.

In the apparatus diagrammed in FIG. 1, the corner cubes 15 and 16 in their assemblies are put into a free flight condition by being propelled upwardly within the accelerating carriage. The propelling mechanism for the accelerating carriage 18 is shown for purposes of illustration to be a bellows 25 which may form a vacuum seal with the top of the carriage. In the "loaded" position the bellows are maintained under tension by suitable means, such as by two or more carriage actuating pins 26 which extend through apertures 27 in the upper end of the accelerating carriage. Pins 26 are adapted for axial movement within their associated carriage actuators 28, this axial movement being effected by a suitable release mechanism 29, such as an electromagnet, located external of the housing. When the actuator pins 26 are withdrawn back into the carriage actuators against spring 30 by the release mechanism, the carriage is freed and moved very rapidly upwardly by the contraction of bellows 25. The accelerating carriage is maintained in alignment by an upper carriage bearing 31 and lower carriage bearing 32. At the end of a measurement the accelerating carriage is returned to its "loaded" position by the carriage return actuator 33 which has a force-applying rod 34 movable along its axis. As the rod 34 forces the carriage downwardly the actuator pins 26, which are shown to be spring-loaded, are moved to engage apertures 27 and hold the carriage in its "loaded" position preparatory to another measurement. With the engagement of pins 26, the force-applying rod 34 is withdrawn upwardly into the carriage return actuator 33.

The sudden movement of the carriage propels the two retroreflectors (represented by corner cubes 15 and 16 in FIG. 1) upwardly to a maximum height which will be limited by the length of the carriage. The retroreflectors upon leaving their supports will be in condition to experience free flight upwardly and then back to their respective supports. During this free flight, radiant energy from a source 40 is transmitted through window 41 to strike the retroreflectors and to be reflected back by them, through an optical system described below, to a detector-preamplifier 42 in a manner to create interference between the two reflected beams which lends itself to sensing and measurement by known techniques.

The radiant energy source 40 should be capable of providing substantially coherent radiation which is also preferably monochromatic. Exemplary of such a radiation source is a frequency-stabilized laser. In brief, the optical components comprise the laser source 40, a beam collimator or expander 44 (shown for purposes of illustration to comprise lenses 45 and 46 and an aperture 47), a beam splitter 48, the lower corner cube 16 in an optical element which makes it possible to also serve as a beam splitter, the upper corner cube 15, a reflecting means such as mirror 49, lens 50 and detector-preamplifier 52. Exemplary of the components which may be associated with the detector-preamplifier 42 to process the signals therefrom are an amplifier 51, an electronic pulse counter 52 and a recorder 53.

Figure 2:
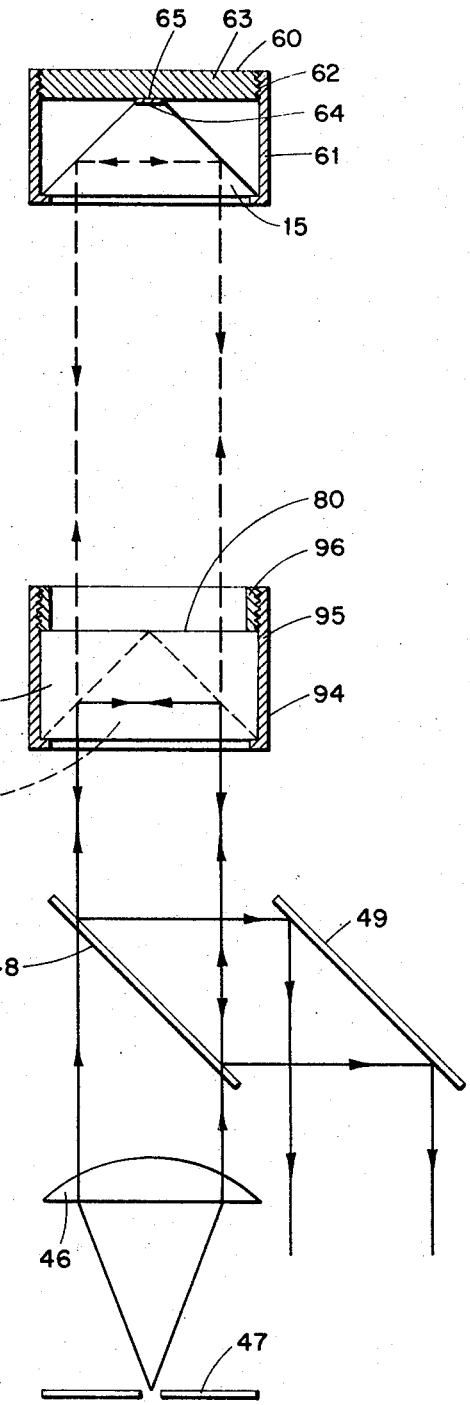
FIG. 2 is an enlarged detail of the optics and optical elements of the gradiometer of FIG. 1.

The optics of the gradiometer of FIG. 1 are shown in enlarged detail in FIG. 2 which illustrates the unique beam splitting device incorporating the corner cube 16. (Like reference numerals are used to identify like apparatus components throughout the drawings.) As pointed out previously, the apparatus includes two retroreflecting assemblies, a term used hereinafter to denote the entire body which is caused to experience free flight. The retroreflecting assemblies comprise a retroreflecting optical element (e.g., corner cubes 15 and 16) and their associated casings. In the case of the lower retroreflecting assembly, it also includes the additional optical elements required to effect the necessary beam splitting. The term "retroreflector" is used herein to designate any optical device that will provide a reflected ray parallel and traveling in the opposite direction to an incident ray independent of the angular orientation of the retroreflector. The term "corner cube" hereinafter is used to mean a retroreflector which is a geometrical figure having three orthogonal plane surfaces.

Figure 3:
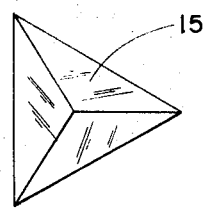
FIG. 3 is a top view of one form of the upper retroreflector.

When the upper retroreflector is a corner cube as illustrated in FIGS. 1-3, it may be hollow or solid. In any case the pyramidal surfaces will be made essentially totally reflecting and the corner cube will be mounted in an assembly 60 (FIG. 2) which includes a cylindrical case 61 flanged slightly inwardly on the bottom to form a base for the three cube corners to rest and which terminates around the top in a threaded ring 62 adapted to receive a threaded disk 63.

The center of gravity of a hollow or solid corner cube does not generally coincide with its optical center, and therefore rotation of the corner cube during its propulsion upwardly and subsequent free fall would produce spurious changes in the optical path unless corrective measures are taken. (See Craig and Rose, Applied Optics, 9:974 (1970).) The corner cube assembly 60 of FIG. 2 is therefore designed to weight it in such a manner as to shift the center of gravity of the retroreflecting assembly to coincide with the optical center of corner cube 15. In this assembly the thickness of the cover which comprises the disk 63 and ring 62 will be determined by the desired weight distribution, a factor which may, of course, also be adjusted by the choice of material from which the casing 61 and disk 63 are formed. Inasmuch as a small volume at the vertex of the cube 15 will contribute little to the usable reflecting area, the corner cube may be flattened off at the vertex so that there is provided a small surface 64 (FIG. 2) to support the cube by the disk 63 through an elastomeric spacer 65.

Figure 4:
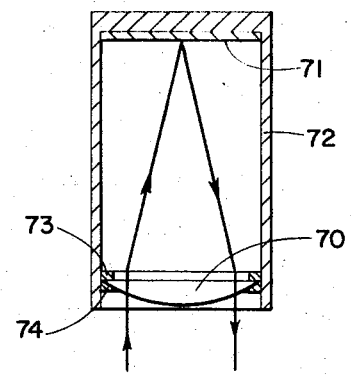
FIGS. 4 and 5 are longitudinal cross sectional views of two other forms of the upper retroreflector embodied in suitable casings to form retroreflecting assemblies.
Figure 5:
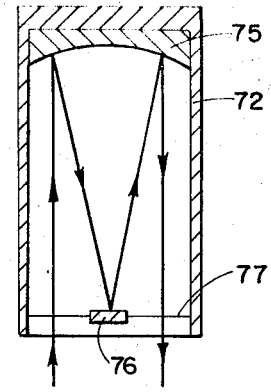

The upper retroreflector may be other than the corner cube 2, and two other forms of retroreflecting assemblies are illustrated in cross section in FIGS. 4 and 5. In FIG. 4, the retroreflector comprises in combination a convex lens 70 held at one focal length from an essentially totally reflecting surface such as mirror 71. The lens and mirror are within a casing 72 which is provided with two internal rings 73 and 74 to hold the lens 70. In FIG. 5 the retroreflector comprises in combination a concave mirror 75 and a small, centrally positioned flat mirror 76 held by several supports 77 at a distance from the concave mirror which is one focal length of the concave mirror.

Figure 6:
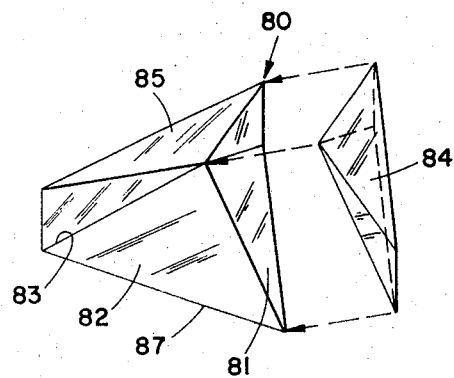
FIG. 6 is a perspective view illustrating the formation of the retroreflecting beam splitter which serves as the lower retroreflector in the gradiometer.
Figure 7:
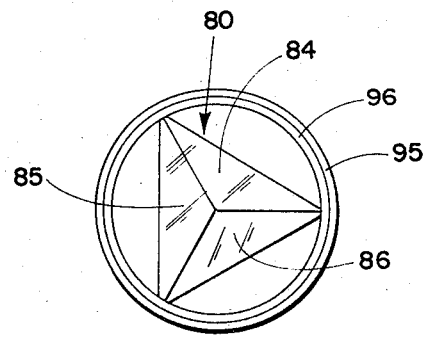
FIG. 7 is a top plan view of the retroreflecting beam splitter of FIG. 6 in its casing to form the assembly illustrated in FIG. 2.

The corner cube 16 is part of an optical element 80 which serves as both a retroreflector and a beam splitter. The corner cube 16 is solid and the three pyramidal reflecting surfaces 81, 82 and 83 (FIG. 6) are coated for partial reflection and partial transmission of light. Adhered to these three partially reflecting-partially transmitting surfaces of the corner cube are three optical elements 84, 85 and 86 formed of a radiation-transmitting material having the same index of refraction as the material from which the corner cube is formed. In FIG. 6, which is a perspective view showing the positioning of element 84 and the final position of element 85, and in FIG. 7, which is a top plan view of the retroreflecting beam splitter 80, the three optical elements are shown to be pyramidal in configuration. The resulting retroreflecting beam splitter of FIGS. 6 and 7 is triangular in cross section. In the embodiment of FIG. 10, the three elements 90, 91 and 92 affixed to the partially reflecting-partially transmitting surfaces of corner cube 16 are cut from a cylinder rather than a triangle as in the case of the retroreflecting beam splitter of FIG. 6. The resulting cylindrical configuration of FIG. 10 may be somewhat easier to mount and is more rugged.

In any embodiment of the retroreflecting beam splitter, the resulting overall geometric configuration should be one which has a second flat surface which is parallel to that flat surface 87 which forms the base of the corner cube.

Normally, the elements (84, 85 and 86 of FIG. 6 or 90, 91 and 92 of FIG. 10) will be formed of the same material as the corner cube and the adhering of these elements to the corner cube may be effected by any one of a number of suitable cements known in the art, the cement having substantially the same index of refraction as the corner cube material.

Coating of optical surfaces to render them partially reflecting and partially transmitting is well known in the art. The coating of the corner cube surfaces should be such as to essentially balance the intensities of the interfering beams.

In the embodiments of FIGS. 6 and 10 the retroreflecting beam splitters are shown to have heights equal to the height of the corner cube as measured from the center of the base to the vertex. It is also possible to construct retroreflecting beam splitters in accordance with this invention in which this height is less than (FIG. 8) or more than (FIG. 9) the height of the corner cube. Although it will generally be preferable to construct the retroreflecting beam splitter so that the vertex of the corner cube is on a line passing through the center and perpendicular to the base of the corner cube, this is not essential, a fact which means that the elements adhered to the corner cube need not all be identical in configuration so long as the final geometrical configuration has the required two plane parallel surfaces as described.

The retroreflecting beam splitter assemblies 94 (FIGS. 2 and 7–9) are formed by encasing the retroreflecting beam splitter, in one embodiment or another, in a cylindrical case 95 which is slightly flanged inwardly on the bottom and threaded around the upper internal wall so that the assembly may be locked together by a threaded ring 96.

The optical center of the retroreflecting beam splitter assembly 94 of FIG. 2, i.e., the point about which rotation of the assembly will not produce spurious changes in the interference signal, is at the vertex of the cube 16. The casing 95 and threaded ring 96 are therefore made of such weight that the center of gravity of the complete assembly 94 will coincide with the vertex of corner cube 16. This may be explained in more detail with reference to FIG. 11 which is a diagram wherein the retroreflecting beam splitter 80 is shown, for simplicity, without the casing and ring. The retroreflecting beam splitter is in essence an optical device which combines the property of a retroreflector to return a plane wave on itself regardless of its angle of incidence and the property of a plane parallel plate to transmit a plane wave without changing its direction. Since any one of the normals to the plane wave can be used as a representative ray to trace the optical path of the wave, consider, for example the ray passing through the vertex of corner cube 16. Part of this ray is reflected at this point and returned along the path it came; and part is transmitted in its original direction. The retroreflecting corner cube 15 will return the transmitted ray upon itself and send it back through the retroreflecting beam splitter 80 to establish an interference signal at the detector. The paths of the two rays through the beamsplitter are identical and separation and recombination of the beams occur at the vertex of the corner cube 16. The vertex must, therefore, be at least one point (hereinafter referred to as the optical center) about which the retroreflecting beam splitter assembly may be turned without changing the relative phase of the two beams. It must also be the only such point, since rotation of the assembly about any other point will translate the vertex with respect to the retroreflector above it, e.g., corner cube 15. Thus if the vertex of corner cube 16 lies exactly in the back surface of the retroreflecting beam splitter 80 and if the index or refraction is constant throughout, the vertex is also the optical center of the assembly.

Figure 8:
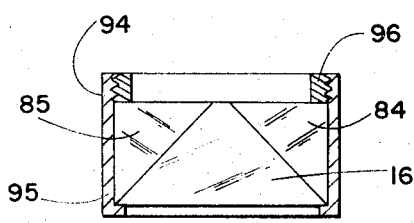

To deal, however, with manufacturing tolerances in the position of the vertex, the imperfect retroreflective beam splitter may be considered to consist of a perfect retroreflecting beam splitter and a plane parallel plate of positive thickness (FIG. 9) or negative thickness (FIG. 8). Calculating the optical retardation produced by tilting such a plate and its associated corner cube separately by the same small angle and by equating the results, it may be shown that for any small error in thickness, a certain point can be found above or below the vertex about which a rotation has no effect on the interference signal at the detector in FIG. 11. For example, if a retroreflecting beam splitter is of uniform index of refraction and is thicker than the height of the vertex of its constituent corner cube by a small amount $\delta$ (indicated by the dotted line in FIG. 11), then the optimum center of rotation will be located at a point which is below the vertex of the corner cube by a small distance $\epsilon$, where $$\epsilon = \delta (1-1/n)$$

and where $n$ is the index of refraction. Similar calculations may be made for the case where the finished beam splitter is thinner than the height of the cube (FIG. 8).

By coating surfaces 81, 82 and 83 of the corner cube (FIG. 6) to make them partially reflecting and partially transmitting, a portion of the light incident upon corner cube 16 is transmitted through the assembly 94 (FIG. 2) to strike corner cube 15 and be reflected back through assembly 94 to the detector-preamplifier 42 (FIG. 1). Likewise, a portion of the light striking corner cube 16 in the assembly 94 is reflected directly to the detector-preamplifier. Because that portion of the radiation which is reflected by corner cube 16 in assembly 94 travels exactly the same distance in the glass of the cube as that portion of the energy which is transmitted through the assembly 94 for reflection by corner cube 15, the phase retardation of the light reflected by corner cubes 15 and 16 is exactly the same.

FIG. 12 is a simplified diagrammatic sketch of a modified optical system constructed in accordance with this invention. The radiation source 40, such as a frequency-stabilized laser, and detector-preamplifier 42 are positioned to eliminate the overlapping of the incident and reflected beams, thus eliminating the beam splitter 48 and reflector 49 (FIG. 1).

Although the gradiometer of this invention is particularly suitable for lowering into boreholes or for other applications where it is advantageous to have an instrument with a minimum diameter, it is also possible to use this gradiometer in making measurements from a moving platform such as an airplane or helicopter. It is therefore possible to incorporate this gradiometer in the instrument disclosed in Ser. No. 62,110 which discloses a gradiometer capable of making direct gravity gradient measurements from a moving platform which are free from errors due to the so-called Coriolis forces.

In the operation of the apparatus shown, when the two retroreflecting assemblies 60 and 94 begin their free flights the radiation which reaches them from laser 40, or other suitable source, is reflected back to the detector-preamplifier which senses radiation intensity, e.g., in the form of light intensity. An example of a suitable detector-preamplifier is a solid state silicon photodiode mounted together with a preamplifier which raises the signal from the silicon photodiode to a level suitable for faithful transmission to amplifier 51. Another suitable detector would be a photomultiplier tube. As shown in FIG. 1, the detector-preamplifier 42 is part of an electronic circuit which includes an amplifier 51, an electronic pulse counter 52 and a suitable recording means 53 such as a digital recorder. All of these components are well-known and commercially available. Their use in conjunction with a detector is also well-known and it is well within the skill of the art to incorporate them in one or another type of circuit to obtain the information in a desired form.

Figure 13:
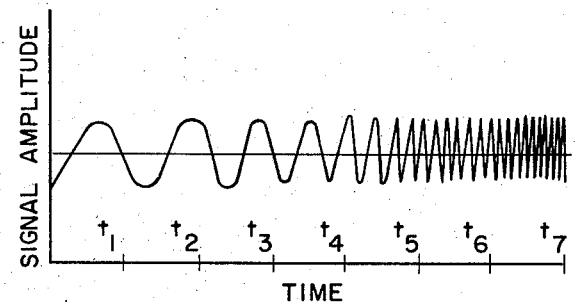
FIG. 13 is an exemplary plot, not to any scale, of Time versus Signal Amplitude (interference signal rates) determined by the detector.
Figure 14:
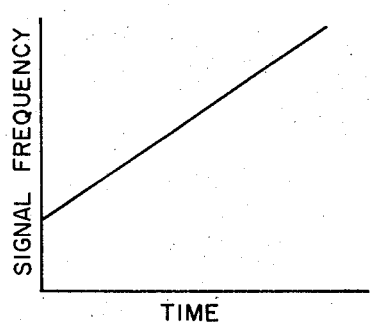
FIG. 14 is a plot of Time versus Interference Signal Frequency where the slope of the curve is a measure of gravity gradients.

As an example, the radiation intensity sensed by the detector may take the form of signals indicating the change of radiation intensity with time as shown in FIG. 13. As the retroreflectors move, the beams reflected from the two retroreflectors are superimposed upon each other prior to striking the detector and a time-varying interference signal is obtained as shown in FIG. 13. Because the bodies in free flight are influenced only by the vertical force of gravity, their rates of fall increase due to the well-known relationship that the distance fallen, $s$, is substantially equal to $\frac{1}{2} gt^2$ where $g$ is the acceleration due to gravity and $t$ is the time elapsed during fall. The rate of change $ds/dt$ is, of course, $gt$ which is a linear relationship. If the gravity gradient is constant, then the difference in vertical velocities of the two retroreflector assemblies is given by $$v_o + l_o \cdot t \cdot dg/dz$$

where $v_o$ is the initial velocity difference, $l_o$ is the initial distance between the two bodies and $dg/dz$ is the vertical gradient of gravity. Thus if the electronic pulse counter 52 of FIG. 1 counts and records the number of pulses per predetermined time unit $t_1, t_2 \ldots t_n$ (or the signal frequency of FIG. 13), it is possible to plot signal frequency versus elapsed time as is done in FIG. 14. If the two retroreflecting assemblies in free flight experience a constant vertical gradient of gravity, then this plot will be a straight line. The slope of this line is directly related to the vertical gradient of gravity.

The signal frequency depends only on the relative vertical velocity of the retroreflecting assemblies. There is no effect on signal frequency due to motion of the instrument frame, energy source or detector-preamplifier. For this reason the measurement of $dg/dz$ is independent of the motion of the instrument frame, the energy source, the detector-preamplifier or the vehicle in which the instrument may be mounted.

Apparatus constructed according to this invention can be made in the form of a very small-diameter cylinder and the external connections required are minimal. The amplifier, pulse counter and recorder in the detector circuit, as well as all of the associated power supplies may all be located at a point remote from the actual gravimeter and may be connected through a single cable if desired. The apparatus may be constructed in a rugged form thus making it particularly suitable for all types of prospecting and field applications.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. A retroreflecting beam splitting optical device comprising a solid corner cube having three surfaces which are partially reflecting and partially transmitting and three optical elements formed of a material having the same index of refraction as the material from which said corner cube is made, one of said elements being affixed to essentially the entire area of each of said three surfaces, said optical elements being shaped to define in combination with said corner cube a geometrical configuration having a flat surface parallel to the flat surface forming the base of said corner cube.

2. An optical device in accordance with claim 1 wherein said geometric figure is triangular in cross section.

3. An optical device in accordance with claim 1 wherein said geometric figure is circular in cross section.

4. An optical device in accordance with claim 1 wherein the vertex of said corner cube is on a line passing through the center and perpendicular to said base of said corner cube.

5. An optical device in accordance with claim 1 wherein the height of said geometrical configuration is appreciably different from the height of said corner cube as measured from said vertex to the center of said corner cube.

6. An optical device in accordance with claim 5 wherein said height is greater than said height of said corner cube.

7. An optical device in accordance with claim 5 wherein said height is less than said height of said corner cube.

8. A retroreflecting beam splitting optical assembly, comprising in combination
   a. a solid corner cube having a flat base and having its remaining three surfaces coated to render them partially reflecting and partially transmitting;
   b. three optical elements formed of a material having the same index of refraction as the material from which said corner cube is made, one of said elements being affixed to essentially the entire area of each of said three surfaces, said optical elements being shaped to define in combination with said corner cube a retroreflecting beam splitting device of a geometrical configuration having a flat surface parallel to said flat base of said corner cube; and
   c. casing means adapted to encase said geometrical configuration in a manner to permit light to be reflected and transmitted by said retroreflecting beam splitting device.

9. An optical assembly in accordance with claim 8 wherein said casing means is weighted to cause the center of gravity of said optical assembly to coincide with the optical center of said retroreflecting beam splitting device.

* * * * *